Aug. 31, 1937.   J. E. FREEBORN   2,091,919
POWER TRANSMISSION MECHANISM
Filed April 9, 1936   2 Sheets-Sheet 1
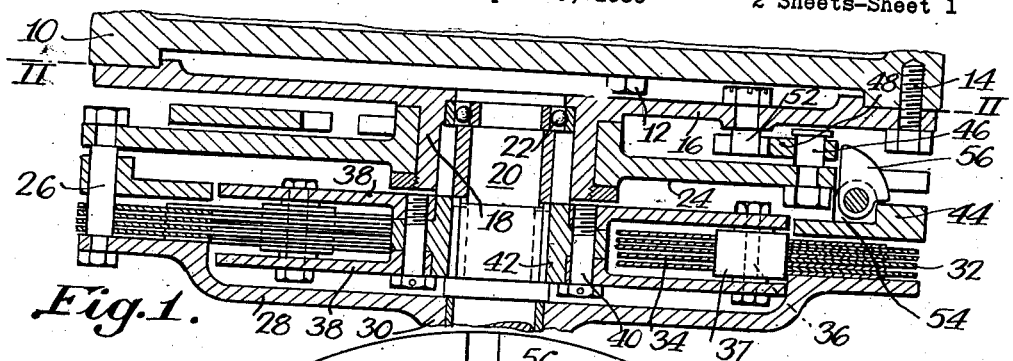
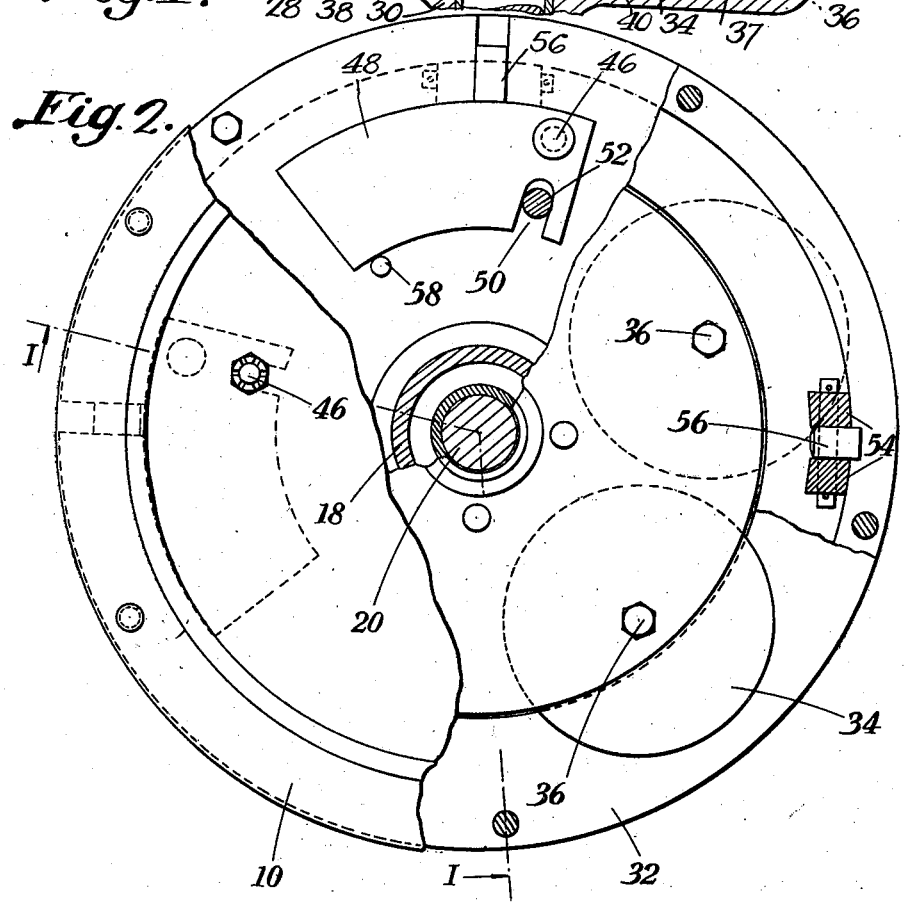

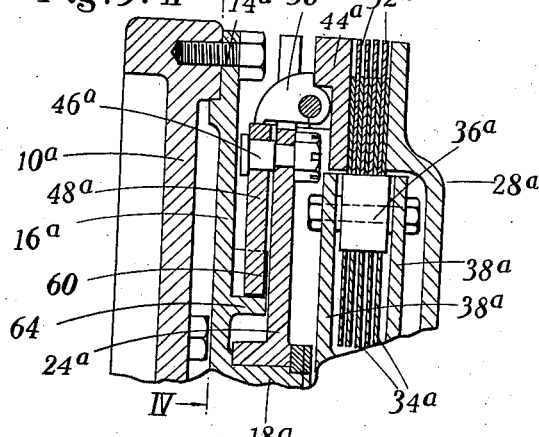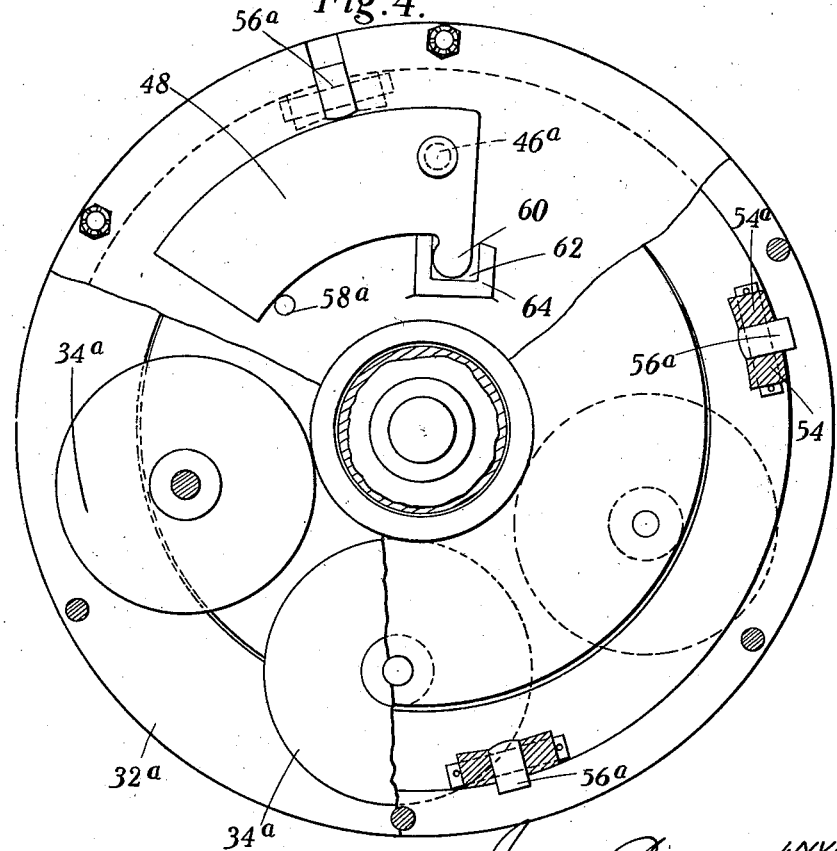

Patented Aug. 31, 1937

2,091,919

UNITED STATES PATENT OFFICE 2,091,919

POWER TRANSMISSION MECHANISM

James Edward Freeborn, London, England, assignor to Freeborn Power Converters Limited, London, England, a British company Application April 9, 1936, Serial No. 73,581
In Great Britain April 16, 1935

2 Claims. (Cl. 192—105)

This invention relates to power-transmission mechanism of the kind known as overload clutches and comprising a friction clutch having means normally holding the clutch in engagement and torque responsive operating means opposed to the said first means so that when the torque transmitted through the clutch reaches a certain limit the clutch is disengaged, thereby disconnecting the drive.

Hitherto such mechanism has been unsatisfactory for three reasons. Firstly, friction clutches of the customary type are not well adapted to run for long periods under slipping conditions because the heat generated by the friction cannot be dissipated fast enough with the result that excessive heating and wear occurs. Secondly, the change from static to dynamic friction when slip begins is abrupt, with the result that when the limit of torque is reached hunting sets in, the clutch first disengaging and then immediately re-engaging thereby bringing about destructive stresses in the mechanism. Thirdly, in these prior proposals the means normally holding the clutch in engagement comprised springs, sometimes employed in conjunction with centrifugal means, thereby introducing an element of unreliability owing to the liability of springs to change their characteristics with changing temperature and other causes.

According to the present invention these disadvantages are overcome by employing a clutch of the kind described in United States Patent No. 2,039,590, and by the provision of centrifugal means as the sole agency for engaging the clutch, thereby eliminating the springs. The clutch described in the aforesaid patent specification comprises discs mounted to rotate freely upon one of the clutch members about eccentric axes and only a portion of the surfaces of the discs is in contact with the plates carried by the other clutch member, with the result that when the clutch slips, thus causing the discs to rotate about their axes, any point on one of the discs is out of contact for at least as long as it is in contact with the plates of the other clutch member, whereby the heat which is generated is quickly dissipated. Moreover, there is no abrupt change of friction when the clutch begins to slip, so that hunting does not occur when the limit of torque is reached.

Referring to the accompanying drawings,

Figure 1 is a side elevation in section of one embodiment of the invention,

Figure 2 is a sectional end elevation of Figure 1, the section being taken on the line II—II in Figure 1, and parts being broken away, Figure 3 is a framentary view similar to Figure 1 of a modified construction, and Figure 4 is an end elevation similar to Figure 2 of this modified construction, the section being taken on the line IV—IV in Figure 3.

Referring first to Figures 1 and 2, 10 is a flywheel secured to a driving shaft (not shown) by means of bolts 12. Attached to the flywheel 10 by screws 14 is a disc 16 provided with a cylindrical hub 18 within which the driven shaft 20 is supported in a ball bearing 22. Another disc 24 is journalled on the hub 18 and is free to rotate thereon. This disc 24 is secured by bolts 26 to a plate 28 having a hub portion 30 journalled on the driven shaft 20. Four flat rings 32 are provided with holes slidable over the bolts 26 and these rings together with the marginal part of the plate 28 constitute one member of a clutch. The other member of this clutch is constituted by five sets of five discs 34 each set being mounted to rotate freely about a spindle 36 on a ball-bearing 37. The five spindles 36 are spaced at equal angular intervals and are supported in two plates 38 secured by screws 40 to a boss 42 keyed to the driven shaft 20.

The rings 32 are interleaved with the discs 34 which are free to slide on the spindle 36. A pressure plate 44 sliding upon the bolts 26 is provided which when moved to the right in Figure 1 presses the rings 32 and the discs 34 together thereby clutching the driven clutch member 38, 42 to the driving clutch member consisting of the discs 24 and the plate 28. This clutch is similar to that described in Patent No. 2,039,590.

The disc 24 carries four pivot pins 46 equally spaced around its margin. On each of these pins is pivoted a centrifugal lever 48 formed with a radial slot 50 embracing a pin 52 fixed to the disc 16. The disc 24 is provided near its periphery with four pairs of lugs 54 and between each pair is pivoted a small bell-crank 56 one arm of which rests upon the outer edge of the centrifugal lever 48 and the other arm bears upon the left-hand face of the pressure plate 44.

The direction of rotation is clockwise as seen in Figure 2. The pins 52 tend to swing the centrifugal levers 48 in the counterclockwise direction so that they bear against stop pins 58 fixed to the disc 24. At a certain speed of rotation the centrifugal levers 48 will swing in the clockwise direction about their pivots thereby swinging the bell-cranks 56 so as to move the pressure plate 44 towards the right. As previously stated this presses the rings 32 and the discs 34 together thereby clutching the driving shaft and the parts fixed to it to the driven shaft 20.

It will be appreciated that the clutch is kept in engagement by the swinging out of the centrifugal levers 48 as a consequence of the rotation of the driving shaft, and that the torque transmitted by the pins 52 tends to swing the centrifugal levers inwards and therefore tends to release the clutch. The parts are so proportioned that when the speed and the torque are normal the clutch is engaged. If now the torque should increase to any considerable extent a condition will be reached when the centrifugal levers 48 will be swung inwards against the action of centrifugal force thereby relieving the pressure exerted by the pressure plate 44 and enabling the clutch to slip. Consequently, at a given speed, there is an upper limit to the torque that the clutch will transmit; if this upper limit is exceeded the clutch will automatically slip.

The modification shown in Figures 3 and 4 differs from that described with reference to Figures 1 and 2 in that the centrifugal levers 48a are formed with inwardly extending arms 60, lodged in slots 62 in projections or bosses 64 formed on the disc 16a. The remainder of the parts are similar to those already described with reference to Figures 1 and 2 and are indicated by the same reference numerals with the suffix a.

I claim:

1. Power transmission mechanism comprising in combination a multiple plate clutch including a plurality of sets of plates one of which comprises a plurailty of discs mounted to rotate freely about eccentric axes and having only a portion of their surfaces in contact with the plates of the other set, torque-responsive clutch operating means comprising a driving member and a driven member having a lost-motion connection between them and centrifugally operated means tending to maintain the clutch in engagement and concurrently tending to advance said driven member in relation to said driving member in opposition to the torque transmitted between said members said centrifugally operated means constituting the sole clutch-engaging agency.

2. Power transmission mechanism comprising in combination a multiple plate clutch including a plurality of sets of plates one of which comprises a plurailty of discs mounted to rotate freely about eccentric axes and having only a portion of their surfaces in contact with the plates of the other set, torque-responsive clutch operating means comprising a driving member and a driven member having a lost-motion connection between them, a plurality of centrifugal levers pivoted eccentrically on said driven member, said levers having arms directed radially inwards and engaged with said driving member and an operative connection between said centrifugal levers and said clutch for engaging the clutch and advancing said driven member in relation to said driving member as a consequence of the outward swinging of said levers under centrifugal action the torque between the driving and driven members constituting the sole restraining agency for the centrifugal levers.

JAMES EDWARD FREEBORN.